United States Patent
Baur et al.

(10) Patent No.: US 6,176,215 B1
(45) Date of Patent: Jan. 23, 2001

(54) METHOD FOR OPERATION OF A DIRECT-INJECTION SPARK-IGNITION INTERNAL COMBUSTION ENGINE

(75) Inventors: Bernd Baur, Esslingen; Peter Hohner, Stuttgart; Günter Karl, Stuttgart; Roland Kemmler, Stuttgart, all of (DE)

(73) Assignee: Daimler Benz Aktiengesellschaft, Stuttgart (DE)

( * ) Notice: Under 35 U.S.C. 154(b), the term of this patent shall be extended for 0 days.

(21) Appl. No.: 09/118,349

(22) Filed: Jul. 17, 1998

(30) Foreign Application Priority Data

Jul. 18, 1997 (DE) .............................. 197 30 908

(51) Int. Cl.[7] .............................. F02B 17/00; F02P 5/15
(52) U.S. Cl. .......................... 123/295; 123/298; 123/606
(58) Field of Search ................................. 123/295, 298, 123/305, 637, 606

(56) References Cited

U.S. PATENT DOCUMENTS

| 3,926,557 | * | 12/1975 | Callies et al. | 123/606 |
|---|---|---|---|---|
| 4,710,681 | * | 12/1987 | Zivkovich | 123/606 X |
| 5,170,760 | * | 12/1992 | Yamada et al. | 123/295 |
| 5,297,519 | | 3/1994 | Simons | 123/298 |
| 5,335,635 | * | 8/1994 | Kadoi et al. | 123/295 |
| 5,553,594 | * | 9/1996 | Ehlers et al. | 123/609 |
| 5,727,520 | * | 3/1998 | Wirth et al. | 123/305 |
| 5,806,504 | * | 9/1998 | French et al. | 123/606 X |
| 5,915,349 | * | 6/1999 | Biemelt et al. | 123/305 X |
| 5,960,766 | * | 10/1999 | Hellmich | 123/295 |

FOREIGN PATENT DOCUMENTS

| 56-156411 | 12/1981 | (JP) . |
|---|---|---|
| 1-30625 | 9/1989 | (JP) . |
| 4-134179 | 5/1992 | (JP) . |
| 57 146059 | 9/1992 | (JP) . |
| 9-88714 | 3/1997 | (JP) . |
| 9-112398 | 4/1997 | (JP) . |

* cited by examiner

Primary Examiner—Tony M. Argenbright
(74) Attorney, Agent, or Firm—Kenyon & Kenyon

(57) ABSTRACT

A method for operation of a direct-injection spark-ignition internal combustion engine operated over large areas of the characteristics map with stratified charge by way of fuel injection during the compression stroke. In order to guarantee reliable mixture ignition and combustion, the method of the present invention provides an ignition system which generates alternating voltage so that high voltage rapidly builds up between the electrodes of a spark plug, and generates ignition sparks with a spark duration that can be defined as a function of operating point.

8 Claims, 2 Drawing Sheets

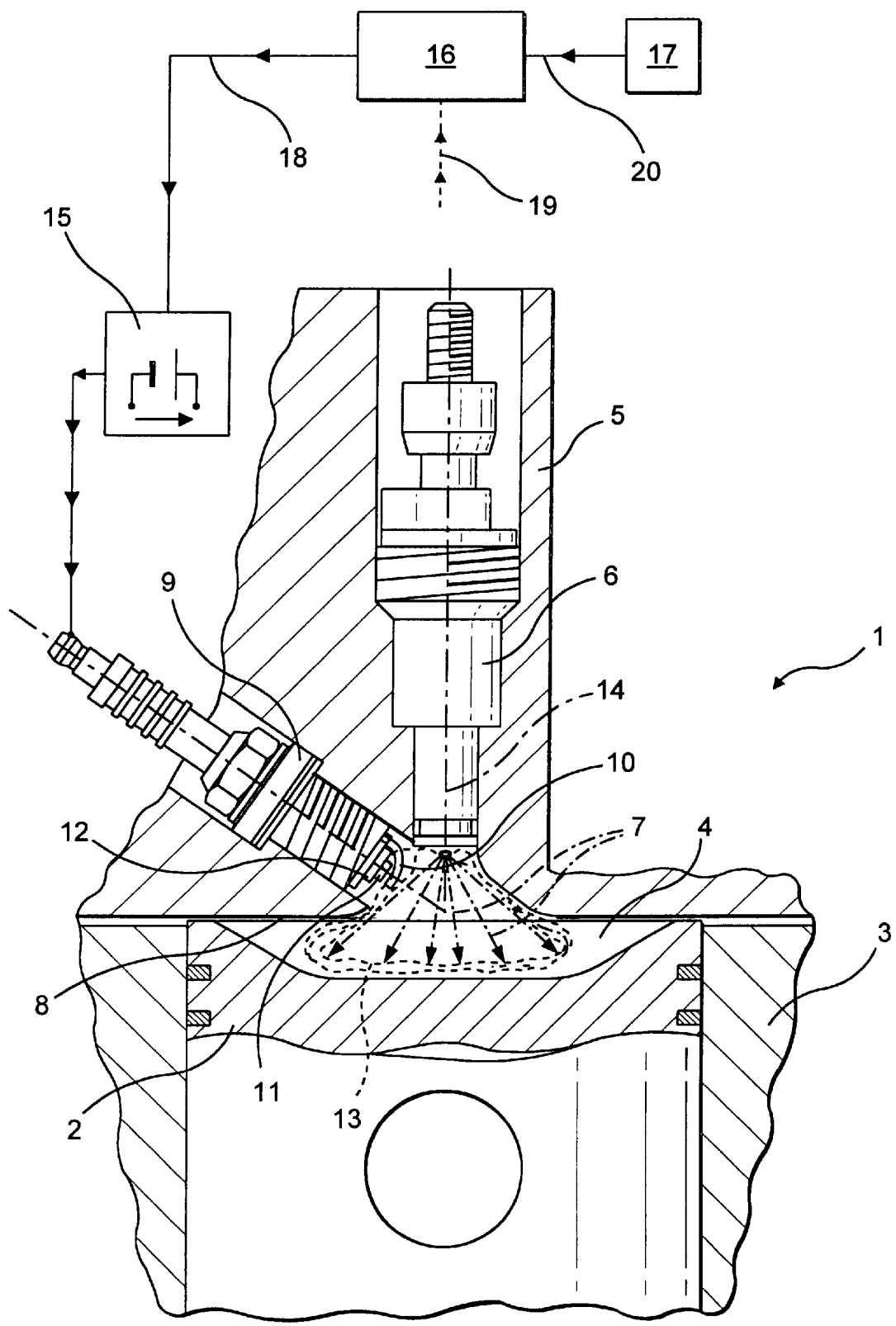
F I G. 1

METHOD FOR OPERATION OF A DIRECT-INJECTION SPARK-IGNITION INTERNAL COMBUSTION ENGINE

FIELD OF THE INVENTION

The present invention concerns a method for operation of a direct-injection spark-ignition internal combustion engine.

RELATED TECHNOLOGY

German Patent Application No. 43 24 642 A1 discloses a direct-injection spark-ignition internal combustion engine having one injector per cylinder, a combustible fuel/air mixture being formed in the respective combustion chamber with the injected fuel and the separately delivered combustion air. The electrodes of a spark plug project into the combustion chamber, and after application of an electrical flashover voltage between the electrodes, the mixture is ignited by sparking. In the known internal combustion engine, stratified-charge operation is provided for over large areas of the characteristics map by injection of fuel during the compression stroke of the working cycle of the respective cylinder. Charge stratification, with locally different fuel/air concentrations, considerably reduces the fuel consumption of the internal combustion engine, particularly under partial load. At full load, the known internal combustion engine operates with homogeneous mixture preparation.

In stratified charge operation, large portions of the volume of the combustion chamber charge are poorly combustible, since their mixture concentrations lie outside the ignition limits, i.e., the mixture between the electrodes of the spark plug is either too lean or too rich for ignition. Combustion chamber flow during charge exchange delivers to the electrodes of the spark plug mixture components with different concentrations, only portions of which lie within the ignition limits and are suitable for ignition by the ignition sparks. If what is located between the electrodes at the moment of ignition, at which an electrical flashover voltage is applied between the electrodes, is a mixture that is unsuitable for ignition, the ignition spark that jumps across cannot bring about ignition of the mixture. The transistorized ignition systems usually used to generate the flashover voltage cannot generate additional ignition sparks during the same working cycle, since the ignition coil charging time is too long for that. If the spark that is generated cannot bring about ignition, a misfire during that working cycle can no longer be avoided.

In addition, in the case of the known spark-ignition internal combustion engine, the electrodes of the spark plug project far into the combustion chamber in order to encounter rich mixture components, and are therefore continuously wetted with fuel, which causes the formation of deposits on the spark plug. Carbon bridges can cause sliding discharges of the flashover voltage onto the spark plug insulator. A misfire can thus occur which is additionally promoted by the reduced high-voltage output of the ignition system. In order to ignite leaner mixtures, a higher ignition energy must therefore often be provided by the ignition system. When, for example, capacitor ignition systems are used, though very high-energy ignition sparks can be generated, they often cannot ignite the mixture because of their very short duration. Misfires must be prevented in all circumstances, since ejecting the uncombusted mixture for that particular working cycle results in high exhaust emissions for the internal combustion engine.

SUMMARY OF THE INVENTION

It is an object of the present invention to create a method for operation of a direct-injection spark-ignition internal combustion engine which guarantees reliable mixture ignition and combustion, especially in stratified-charge operation.

The present invention therefore provides a method for operation of a direct-injection spark-ignition internal combustion engine (1), one injector (6) per cylinder (3) injecting fuel into the combustion chamber (4) and a combustible fuel/air mixture being formed along with separately delivered combustion air, that mixture being ignited, after application of an electrical flashover voltage between the electrodes (10, 11) of a spark plug (9) projecting into the combustion chamber (4), by sparking. Stratified charge operation is provided over large areas of the characteristics map of the internal combustion engine (1) by injection of fuel during the compression stroke in the working cycle of the respective cylinder (3), wherein an ignition system (15) generates alternating voltage so that high voltage rapidly builds up between the electrodes (10, 11) and triggers ignition sparks with a spark duration that can be defined as a function of an operating point.

An ignition system generates alternating voltage, and thus the ignition voltage, with a sufficiently high transformation rate and charges the ignition coil in such a way that the quantities of energy delivered in packaged fashion by the ignition coil generate practically a continuous ignition spark. The energy packages can be generated one after another by the ignition system in any quantity, so that an ignition spark of any desired spark duration can be formed between the electrodes, the spark duration being defined as a function of an operating point. If the ignition voltage that is applied does not lead to ignition of the mixture, for example due to sliding discharge of the spark via the spark plug insulator, a further ignition spark can then be triggered in the same working cycle, and the mixture can be reliably ignited.

Advantageously, a control unit generates a control signal having required information about the spark duration on the basis of at least one operating parameter of the internal combustion engine. The control signal, which is conveyed to the ignition system, may based on, for example, the engine speed, operating load, stratified-charge operation, exhaust gas recirculation, etc. The information for allocating the respective spark duration to the operating point of the internal combustion engine that has been determined can be stored in a characteristics map memory, and is taken from there by the control unit as necessary.

In particularly advantageous fashion, multiple ignition sparks can also be triggered one after another in one ignition interval during each working cycle, so that the probability that one of those ignition sparks will encounter combustible mixture concentrations between the electrodes, with a low utilization of energy by the ignition system, is increased.

BRIEF DESCRIPTION OF THE DRAWINGS

An exemplary embodiment of the invention is explained in more detail below with reference to the drawings, in which:

FIG. 1 shows a longitudinal section through a cylinder of a direct-injection spark-ignition internal combustion engine.

DETAILED DESCRIPTION

Figure 2:
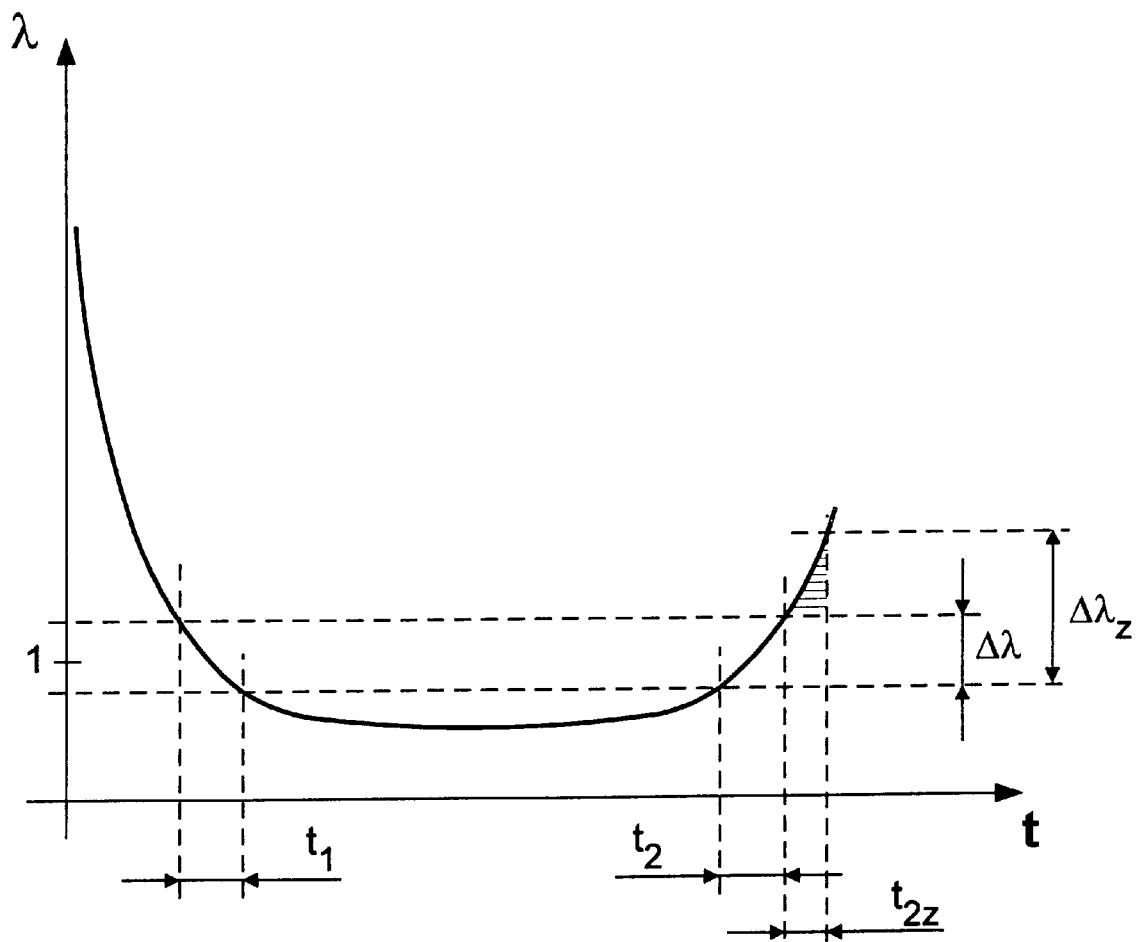
FIG. 2 shows, in a diagram, the plotted change in mixture concentration between the electrodes of the spark plug over time, during a working cycle.

FIG. 1 depicts, in a longitudinal section through a direct-injection spark-ignition internal combustion engine 1, a cylinder 3 in which a piston 2 is arranged in longitudinally movable fashion and delimits a combustion chamber 4. A cylinder head 5 covers cylinder 3 and closes off combustion chamber 4. Arranged in cylinder head 5, in a central position and lying on a cylinder axis 14 with access to combustion chamber 4, is an injector 6 which, for mixture preparation, injects fuel into the combustion chamber along with combustion air delivered separately via an intake duct. The fuel is injected centrally into combustion chamber 4, through a conical-spray nozzle of injector 6, in a conical spray 7 which widens toward piston 2. In large areas of the characteristics map of internal combustion engine 1, stratified-charge operation is provided by injecting fuel during the compression stroke in the working cycle of the respective cylinder 3. Conical spray 7 is injected during the compression stroke of piston 2, thus forming a stratified mixture cloud 13 in a central position in the combustion chamber. The fuel concentration decreases from the core of mixture cloud 13 toward the edge of conical spray 7. Charge stratification makes it possible to achieve consumption advantages, particularly under partial load, by leaning the mixture over large portions of combustion chamber 4 and providing the fuel mixture for combustion predominantly centrally.

A spark plug 9 is arranged in cylinder head 5 in such a way that its electrodes 10 and 11 project through combustion chamber roof 8 into combustion chamber 4, and are thus located in the edge region of conical spray 7 and of mixture cloud 13. The location in the edge region of the spray largely prevents wetting of electrodes 10 and 11 with fuel, as well as the associated formation of deposits which can lead to damaging sliding discharges via insulator base 12 of spark plug 9. To ignite mixture cloud 13, an electrical flashover voltage is applied between center electrode 10 and ground electrode 11 which is electrically connected to cylinder head 5, and an ignition spark is triggered. The ignition system generates alternating voltage, and in the short time period of approximately 12 microseconds transforms the necessary flashover voltage and charges the ignition coil of the ignition system. With this rapid buildup of high voltage, corresponding energy packages can be generated one after another in any desired quantity, thus resulting in an ignition spark of any desired length. The rapid buildup of high voltage moreover results in low losses caused by resistive shunting due to carbon accumulation on electrodes 10 and 11 and insulator base 12, and allows a very high voltage to be generated. The rapid buildup of high voltage moreover promotes spark punchthrough between the electrodes, and prevents sliding discharges via spark plug insulator 12.

A control unit 16 generates a control signal 18 as a function of the particular operating point of internal combustion engine 1. Control signal 18, which has information regarding the necessary spark duration, is conveyed to ignition system 15 to cause mixture ignition by spark plug 9. To determine the existing operating point, continuously measured data regarding various operating parameters 19 of internal combustion engine 1 are delivered to control unit 16 and are used as the basis for determining the required spark duration. The measured data may include engine speed, operating load, etc. Control unit 16 takes from a characteristics map memory 17 allocation data 20 stored therein regarding the spark duration previously determined for the existing operating point, for reliable ignition and optimum operation of the internal combustion engine. Reliable mixture ignition by electrodes 10 and 11 located in the edge region of mixture cloud 13 is therefore guaranteed with a minimal energy expenditure. The long spark duration ensures that the ignition spark encounters the ignitable mixture volume occasionally present at electrodes 10 and 11 as a result of combustion chamber flows during charge exchange.

When internal combustion engine I is at idle, a small quantity of fuel is injected into combustion chamber 4, thus necessitating a long spark duration of up to 5 milliseconds for mixture ignition in stratified-charge operation. Because of the small input of fuel, the mixture at electrodes 10 and 11 of spark plug 9 is too lean for ignition at the edge of mixture cloud 13. Because of combustion chamber flow during charge exchange, however, ignitable mixture components are temporarily driven between electrodes 10 and 11 and are reliably ignited by the ignition sparks which persist for the long spark duration. As the load of the internal combustion engine increases, the injected quantity increases and a correspondingly shorter spark duration is sufficient for mixture ignition. With the internal combustion engine operating at full load, mixture preparation is homogeneous. Because of this good mixture preparation, only ignitable mixture is present between the electrodes, and a minimal spark duration of approximately 0.3 milliseconds is sufficient for ignition.

The long spark duration resulting from the rapid buildup of high voltage between the electrodes from the alternating voltage makes it possible to expand the time window available for ignition, as shown by the diagram in FIG. 2. The diagram depicts the change over time in mixture concentration between the electrodes of the spark plug during one working cycle, time t being indicated on the abscissa, and the ordinate indicating the air ratio $\lambda$ of the mixture concentration. The curve illustrates that immediately after injection, the air ratio between the electrodes quickly falls into the overrich range outside the ignition limits, and after a certain preparation time quickly rises again to lean proportions. Mixture ignition by the ignition sparks can only occur if the mixture composition lies within the ignition limits $\Delta\lambda$ around the stoichiometric air ratio $\lambda=1$.

Two time intervals $t_1$ and $t_2$, during which the mixture composition between the electrodes is ignitable, are thus available for potentially successful mixture ignition. A lean mixture is present before reaching the first ignition interval $t_1$ and after leaving the second ignition interval $t_2$, while between the two ignition intervals the mixture that is present is too rich for ignition. With the long spark duration resulting from the use of alternating voltage, however, the time interval $t_2$ can be extended, since even after the value has gone above the upper, lean ignition limit, combustion chamber flow briefly forces ignitable mixture components between the electrodes, and these can be encountered by the long-duration sparks. The time interval available for reliable ignition can thus be extended by a value $t_{2'}$. Ignition is advantageously accomplished during the second time interval $t_2$, when the mixture cloud in the combustion chamber has stabilized and ignitable mixture can be retained between the electrodes. The mixture cloud is homogenized toward the end of the compression stroke, thus preventing incomplete combustion and therefore an elevated particulate concentration in the exhaust of the internal combustion engine.

Advantageously, a plurality of ignition sparks can also be triggered one after another in one ignition interval during each working cycle of the internal combustion engine. Even after extended stratified-charge operation and possibly after carbon deposits have already formed on the spark plugs, the probability of mixture ignition with a low ignition system energy consumption can be increased by way of a plurality of ignition sparks which flash over through the mixture. In addition, sliding discharges by a few ignition sparks of such ignition spark chains cause the carbon residues on the spark plug insulator base to be burned off.

What is claimed is:

1. A method for operation of a direct-injection spark-ignition internal combustion engine having one piston per cylinder and one injector per cylinder for injecting fuel into a combustion chamber comprising:

forming a combustible fuel/air mixture with separately delivered combustion air, stratified charge operation being provided over large areas of a characteristics map of the internal combustion engine by injection of fuel centrally into the combustion chamber in a conical spray widening toward the piston during a compression stroke in a working cycle of a respective cylinder;

igniting the mixture by applying an electrical flashover voltage between electrodes of a spark plug projecting into the combustion chamber, the ignition occurring in an edge region of the conical spray; and generating alternating voltage using an ignition system, so that high voltage rapidly builds up between the electrodes and triggers ignition sparks for the igniting step, wherein the high voltage triggering the spark is alternating voltage, and a spark duration being a function of an operating point.

2. The method as recited in claim 1 further comprising generating a control signal using a control unit, the control signal being a function of at least one operating parameter of the internal combustion engine and the control signal having information concerning the spark duration, and delivering the control signal to the ignition system.

3. The method as recited in claim 2 wherein the control unit takes information from a characteristics map memory, the information having spark duration data as a function of operating point data.

4. The method as recited in claim 1 wherein the igniting step includes triggering a plurality of ignition sparks in one ignition interval during each working cycle where ignitable mixture components being present between the electrodes.

5. The method as recited in claim 1 wherein ignition occurs during respective subsequent ignition intervals of the working cycle.

6. The method as recited in claim 1 further comprising the step of arranging at least a portion of the electrodes inside the edge region of the conical spray.

7. The method as recited in claim 1, wherein the high voltage builds up within a time period corresponding to 12 microseconds.

8. The method according to claim 1, wherein the spark duration ranges from 0.3 to 5 milliseconds.

* * * * *